United States Patent
Gueller et al.

(10) Patent No.: US 10,760,945 B2
(45) Date of Patent: Sep. 1, 2020

(54) APPARATUS FOR METERING A SUBSTANCE

(71) Applicant: Chemspeed Technologies AG, Fullinsdorf (CH)

(72) Inventors: Rolf Gueller, Herznach (CH); Pascal Chappuis, Laufen (CH); Markus Schindler, Ennetburgen (CH)

(73) Assignee: Chemspeed Technologies AG, Fullinsdorf (CH)

( * ) Notice: Subject to any disclaimer, the term of this patent is extended or adjusted under 35 U.S.C. 154(b) by 203 days.

(21) Appl. No.: 16/083,118

(22) PCT Filed: Mar. 2, 2017

(86) PCT No.: PCT/CH2017/000020
§ 371 (c)(1),
(2) Date: Sep. 7, 2018

(87) PCT Pub. No.: WO2017/152293
PCT Pub. Date: Sep. 14, 2017

(65) Prior Publication Data
US 2019/0078928 A1    Mar. 14, 2019

(30) Foreign Application Priority Data
Mar. 7, 2016 (CH) .......................................... 287/16

(51) Int. Cl.
*G01G 13/02* (2006.01)
*G01G 17/06* (2006.01)
(Continued)

(52) U.S. Cl.
CPC ......... *G01G 13/022* (2013.01); *G01G 13/006* (2013.01); *G01G 13/247* (2013.01);
(Continued)

(58) Field of Classification Search
CPC .. G01G 13/022; G01G 13/006; G01G 13/247; G01G 13/285; G01G 17/00; G01G 17/06
See application file for complete search history.

(56) References Cited

U.S. PATENT DOCUMENTS

| 7,931,869 B2 | 4/2011 | Gueller et al. |
| 9,903,747 B2 * | 2/2018 | Rizun ................... G01F 19/005 |

(Continued)

FOREIGN PATENT DOCUMENTS

| CN | 103575613 A | 2/2014 |
| CN | 204461585 U | 7/2015 |

(Continued)

*Primary Examiner* — Randy W Gibson
(74) *Attorney, Agent, or Firm* — The Webb Law Firm (57) ABSTRACT

An apparatus for metering a substance into a target container includes a gripping tool, with which a metering tool can be picked up and released, and a scales. The metering tool is configured as an adhesive body which is wetted by a substance so that a small amount of substance measurable by the scales remains adhering to the metering tool. Once the desired amount of substance has been picked up with the metering tool, the latter, including the substance adhering thereto, is released into the target container. A controller controls the scales and the gripping tool and decides whether the amount of substance picked up by the metering tool is usable or whether more substance should be picked up or whether the metering tool should be discarded and somewhat less substance picked up with a fresh metering tool.

27 Claims, 10 Drawing Sheets (51) Int. Cl.
  *G01G 13/00* (2006.01)
  *G01G 13/24* (2006.01)
  *G01G 13/285* (2006.01)
  *G01G 17/00* (2006.01)

(52) U.S. Cl.
  CPC ........... *G01G 13/285* (2013.01); *G01G 17/00* (2013.01); *G01G 17/06* (2013.01)

(56) References Cited

U.S. PATENT DOCUMENTS

| | | | |
|---|---|---|---|
| 10,184,818 B2 * | 1/2019 | Rizun | .................... G01F 19/005 |
| 2004/0044439 A1 * | 3/2004 | Gueller | .............. G01G 13/2851 |
| | | | 700/240 |
| 2014/0020959 A1 | 1/2014 | Liu et al. | |

FOREIGN PATENT DOCUMENTS

| | | |
|---|---|---|
| CN | 103278226 B | 11/2015 |
| JP | 2009175043 A | 8/2009 |
| WO | 03098170 A1 | 11/2003 |
| WO | 2006075201 A1 | 7/2006 |

* cited by examiner

Fig. 18

APPARATUS FOR METERING A SUBSTANCE

CROSS-REFERENCE TO RELATED APPLICATIONS

This application is the United States national phase of International Application No. PCT/CH2017/000020 filed Mar. 2, 2017, and claims priority to Switzerland Patent Application No. 287/16 filed Mar. 7, 2016, the disclosures of which are hereby incorporated in their entirety by reference.

BACKGROUND OF THE INVENTION

Field of the Invention

The present invention relates to an apparatus and a method for metering a substance into a target container.

Description of Related Art

Metering substances is one of the core challenges in sample preparation and in the preparation of formulations and chemical reactions. A particular challenge is always to ensure the greatest possible precision and accuracy of metering with the lowest possible technical outlay. Although this is technically fairly simple to implement in the case of amounts above 20-50 mg, below those limits it is very complex and cost-intensive to carry out accurate and precise metering operations. Especially when metering operations in the milligram or sub-milligram range are to be carried out, traditional liquid or solids metering tools are no longer useful (that is to say accurate and precise). This is particularly the case when a large number of different substances are to be metered and the substances, or a portion thereof, are to be moved from one container to another container.

Traditional metering tools, such as pump-controlled metering needles or solids metering devices which meter powder or particles of a solid substance, for example by means of a worm gear or mill-like conveyor mechanisms, are already inadequate in the single-digit to two-digit milligram range, for example on account of the smallest possible droplet sizes of the liquids to be metered (often about 10-20 mg) or the smallest possible amounts of solids to be portioned (likewise in the range of 10-20 mg). Precise and reproducible metering of even smaller amounts is not possible with such devices. In particular, however, such tools are not suitable in principle when, for example, individual substances are to be picked out from a substance library, because it makes no sense first to introduce such a substance into an extruder in order then to carry out a single metering operation and then do the same for the further substances.

WO 03/098170 A1 describes a computer-controlled metering apparatus which is suitable for substances of virtually any consistency (pulverulent, liquid, oily, pasty, resinous). In one embodiment the metering apparatus is equipped with a needle filling head which is attached to an electronic scales, the needle filling head being mounted together with the scales on a robot arm and being movable by the latter in three dimensions. The needle filling head has a needle support on which a multiplicity of metering needles, in the form of small tubes which are open towards the bottom, are mounted in groups of different diameters of from 0.1-5 mm. To pick up substance, by means of the robot arm the metering needles or tubes are immersed or inserted in a defined way into the substance to be picked up, which is present in a storage container, during which different amounts of substance, depending upon the diameters of the tubes, enter the lower ends of the tubes and remain suspended therein. The needle filling head is then raised and guided over the opening of the receptacle to be filled. Plungers provided in the needle filling head are then inserted selectively into the tubes from above and the substance present in the tubes is thereby expelled from the tubes into the receptacle. The metering operation is effected stepwise, that is to say the emptying of the tubes begins with the tubes of larger diameter and continues towards tubes of smaller diameter until in the course of this stepwise approach the desired metered amount has been reached. The amount of substance added to the receptacle in each metering step (the emptying of a tube) is registered by means of the scales and, if the desired metered amount has not yet been reached, the electronic controller brings about the stepwise emptying of the further tubes. In addition, it is also possible to provide a further scales of greater precision on which the receptacle stands and with which exact registration of the actual amount metered is possible.

Although the metering apparatus known from WO 03/098170 A1 solves the problem of different substance consistencies, it is not suitable or has only limited suitability for filling small and extremely small substance containers having capacities in the milligram or sub-milligram range. One reason for this is that such substance containers (what are known as vials) are very small and are usually arranged tightly packed one next to the other in racks and the substances are often present in such small amounts that they do not even cover the base or the substance adheres to the container walls. Since the openings of such substance containers are much too small to accommodate all the tubes of the needle filling head at the same time, the needle filling head would have to be moved for each individual metering operation in order to position the appropriate tube exactly above the substance container. In that case, however, at least some of the respectively adjacent tubes would be located above one or more of the other substance containers in the rack and the risk of contamination of those substance containers would then be very high. A similar problem arises as a result of the fact that the storage containers from which the substances to be filled are withdrawn must be of a certain minimum size in order that the tubes of the needle filling head can enter into them. Substance libraries, however, often contain many substances in such small quantities that the storage containers are simply too small for the use of the known metering apparatus.

A further serious problem lies in the inherent risk of contamination per se. Since it cannot be reliably ruled out that traces of substance will remain in or adhering to the parts of a liquid or solids metering apparatus that are in contact with the substance, the parts in question must be thoroughly cleaned before each metering operation with a different substance. This is relatively labour-intensive, however. Alternatively, it would, of course, also be possible to replace the metering tools or at least the substance-bearing parts thereof (metering tools such as needles, liquid cartridges, solids containers, . . . ) in their entirety. This would likewise be laborious, however, and above all would require the storage of a large number of metering apparatuses and metering tools, which would be undesirable on economic grounds.

A further problem is also that in the case of liquid or viscous substances in such small quantity ranges, the capillary forces are, relatively speaking, high and even with a relatively tight cylinder the liquid substance has the tendency to rise up between the plunger and the cylinder. Those components would have to be laboriously sealed, which is expensive for a disposable tool and, above all, is substance-dependent. Furthermore, when expelling a liquid substance it is also difficult to expel, that is to say to release, anything below the size of a droplet of the substance in question.

An objective of the present invention is now to provide a metering apparatus which avoids the described disadvantages of the known metering apparatuses and at the same time is also suitable for metering liquids and solids in the milligram and sub-milligram ranges. More specifically, an economical solution for a metering apparatus is to be defined which is suitable for a wide range of substances, but especially for liquids, and is able to meter even extremely small amounts of substance with sufficient precision down to the milligram and sub-milligram ranges and with which contamination problems are reliably avoided without requiring any special outlay.

SUMMARY OF THE INVENTION

The problems underlying the invention are solved by the apparatus according to the invention for metering a substance, and by the method for metering a substance.

In respect of the metering apparatus, the core of the invention lies in the following: an apparatus for metering a substance into a target container comprises a metering tool for picking up and releasing substance. The metering tool is configured as an adhesive body, to the surface of which the substance to be metered is able to adhere. The apparatus has a gripping tool with which the metering tool can be picked up, held and released again. The apparatus is configured to provide the metering tool with substance to be metered, so that the latter adheres to the metering tool, and, by means of the gripping tool, to release the metering tool with the adherent substance into the target container or immerse it in the target container until the adherent substance has detached from the target metering tool. The apparatus also has a scales for determining the amount of substance adhering to the metering tool, and a controller for the scales and for the gripping tool.

By configuring the metering tool as an adhesive body it is possible to meter extremely small amounts of substance. The amount of substance adhering to the metering tool can be determined by means of the scales. The variant in which the metering tool is immersed in the target container until the adherent substance has detached from the metering tool can be especially advantageous when the substance is being released into a solution, because on immersion of the metering tool in the solution the substance adhering to the metering tool can simply be dissolved in the solution.

Advantageously the adhesive body is configured as a rod, preferably a cylindrical rod. Very especially advantageously the adhesive body, at its end not intended for being held by the gripping tool, is configured to counteract droplet formation, especially being rounded or tapering to a point. This is especially advantageous in the case of relatively large diameters. It is less relevant, or is automatically provided, in the case of very small diameters, because the adhesive surface of the droplet is then small per se. The adhesive body can advantageously also be configured as a whole in the form of a rod, especially a conical rod, that tapers to a point. Such advantageous configurations of the adhesive body allow simple and economical production of the adhesive body, so that the latter is suitable for single use. The configuration of the metering tool as a disposable body firstly enables substances of many different consistencies (especially liquids, but also powders, etc.) to be metered and, secondly, entirely eliminates the contamination problem, because by virtue of its extremely simple design the metering tool can be produced so economically that it can be discarded after each use. The basic concept is that a portion of the metering tool is provided with the substance to be metered, with a small amount of the substance remaining adhering to the metering tool. The metering tool with the substance adhering thereto is then moved to the target vessel into which it is released or immersed. This is simple to calibrate, because, under the same conditions with the same substance, the provision of the surface with substance is reproducible, that is to say is identical within a range of statistical error, especially with the same immersion depth in a substance container containing the substance to be metered, and, especially in the case of thin cylindrical rods, this can readily be calculated in advance in respect of new immersion depths.

To effect adhesion of the substance (wetting in the case of liquids) the adhesive body, by virtue of its rod-shaped configuration, can be immersed in a substance to be metered, which is present in a substance container, it being possible to control the amount of substance remaining adhering to the rod by adjusting the immersion depth.

Advantageously the adhesive body, at its end not intended for being held by the gripping tool, has an adhesion-enhancing surface structure, for example grooves, points, projections, pores, openings or a roughened surface. As a result, even substances having less good adhesion are able to adhere to the adhesive body.

The adhesive body can also at least just be configured so that it has no substance-repelling properties at its end not intended for being held by the gripping tool.

The adhesive body can advantageously also be spheroidal, especially spherical. Since spheres or similar bodies are often used as tools in other working steps of a formulation procedure, for example in order to improve intermixing during a mixing operation or to comminute solids, the use of adhesive bodies so shaped for the addition of extremely small amounts of substances is especially advantageous.

Advantageously the adhesive body has a maximum diameter in the range of from 0.1 to 3 mm, preferably from 0.1 to 2 mm, more preferably from 0.1 to 1 mm. As a result, especially small amounts of substance can be transferred with the adhesive body.

The adhesive body advantageously consists of a chemically inert material, especially glass, but other materials are also possible. The use of such chemically inert materials allows the metering tool to be left behind in the target vessel, where it has no adverse effect on the chemical processes taking place therein, but can to some extent even have positive effects on physical processes (especially mixing operations).

The adhesive body can advantageously also be configured to be ferromagnetically or electrostatically or electromagnetically chargeable. This increases the scope for substances to be metered to adhere to its surface. By selective electrostatic charging of the adhesive body it is possible to improve the adhesion of certain pulverulent substances to the adhesive body. The magnetic charging of the adhesive body enables ferromagnetic solids to adhere to the adhesive body. By virtue of the ferromagnetic configuration, the adhesive body (for example after the substance has been mixed in) can, in addition, simply be either removed from the target container or, during emptying of the target container, held in place therein by means of a magnet.

Advantageously the controller is configured to carry out the following steps:

a) picking-up of a metering tool by means of the gripping tool;

b) provision of the metering tool with substance to be metered;

c) determination of the amount of substance adhering to the metering tool;

d) if the adherent amount of substance is greater than a desired amount, discarding of the metering tool and repetition of steps a)-d) with a fresh metering tool until the adherent amount of substance is less than the desired amount or corresponds to the desired amount;

e) if the adherent amount of substance is less than the desired amount, further provision of the metering tool with substance to be metered and repetition of steps c)-e) until the adherent amount of substance corresponds to the desired amount; and f) if the adherent amount of substance corresponds to the desired amount, positioning of the metering tool above the target container and dropping of the metering tool with the adherent amount of substance into the target container or immersion of the metering tool with the adherent amount of substance in the target container until the adherent substance has detached from the metering tool.

This configuration of the controller allows the metering operation to be carried out largely automatically, and before each definitive metering operation a decision can be made as to whether or not the amount of substance picked up corresponds to the target amount and so the formulation or the chemical reaction can be safeguarded against having an incorrect composition. Using this procedure it is possible, in principle, to achieve very high accuracy, since it is virtually always possible to weigh in an amount of substance exactly up to the reading of the scales.

The scales can be configured and arranged for measuring the weight of a substance container from which the substance to be metered is withdrawable. If the adhesive body is provided with substance by immersion in the substance container and subsequent removal therefrom it is thereby possible for the amount of substance adhering to the adhesive body to be determined simply by weighing the substance container before and after immersion and removal of the adhesive body.

Advantageously the scales is configured and arranged for measuring the weight of the metering tool or adhesive body held by the gripping tool. By weighing the adhesive body before and after its provision with substance it is accordingly possible for the amount of substance adhering to the adhesive body to be determined in a simple way.

The apparatus is advantageously equipped with a scales on the metering tool and, for monitoring purposes, with a scales below the target container.

Advantageously the apparatus is equipped with a raising and lowering device by means of which the gripping tool can be raised and lowered, which device co-operates with the controller. In this way the metering tool or the adhesive body can simply be immersed in a substance container and removed again therefrom. By means of the raising and lowering device, movement of the gripping tool with the metering tool can be more sensitive than in the case of movement of the entire apparatus.

Advantageously the apparatus is equipped with a robot arm which co-operates with the controller and to which the gripping tool is attached, the gripping tool being movable by means of the robot arm preferably in all three spatial directions and also about a vertical rotational axis. This allows all the movement sequences of the apparatus required for a metering operation to be carried out in a simple way.

The rotatability of the gripping tool about a vertical (in the normal operating position) rotational axis enables the metering tool to be rotated about its (vertical) longitudinal axis during immersion or insertion into a substance present in the substance container and preferably also during withdrawal from the substance. The rotational movement facilitates insertion in the case of substances having a relative solid consistency. In addition, it prevents the metering tool from becoming stuck in the substance.

Advantageously the apparatus is equipped with a rack for a number of a plurality of identical or a plurality of at least to some extent different metering tools or with at least one dispenser for metering tools. In this way it is possible to select the metering tool most suitable for the particular metering task or substance/amount of substance to be metered.

The apparatus can advantageously also have a dispensing tool for (direct) provision of the metering tool with substance to be metered. As a result, the metering tool need not be immersed in a substance container in order to be provided with substance.

In respect of the metering method, the core of the invention lies in the following: a method for metering a substance using the apparatus according to the invention comprises the following steps:

a) picking-up of a metering tool configured as an adhesive body by means of the gripping tool;

b) provision of the metering tool with substance to be metered;

c) determination of the amount of substance adhering to the metering tool;

d) if the adherent amount of substance is greater than a desired amount, discarding of the metering tool and repetition of steps a)-d) with a fresh metering tool until the adherent amount of substance is less than the desired amount or corresponds to the desired amount;

e) if the adherent amount of substance is less than the desired amount, further provision of the metering tool with substance to be metered and repetition of steps c)-e) until the adherent amount of substance corresponds to the desired amount; and f) if the adherent amount of substance corresponds to the desired amount, positioning of the metering tool above the target container and dropping of the metering tool with the adherent amount of substance into the target container or immersion of the metering tool with the adherent amount of substance in the target container until the adherent substance has detached from the metering tool.

This method enables extremely small amounts of an extremely wide variety of substances to be metered with great precision into a target container, with contamination problems being completely avoided.

In steps d) and e), preferably the difference between the amount of substance adhering to the metering tool and the desired amount is determined and, in dependence thereon, the provision of the metering tool with substance to be metered is adjusted appropriately, especially by means of a controller.

Advantageously the provision of the metering tool with substance to be metered comprises the following steps:

b1) positioning of the metering tool above a substance container;

b2) lowering of the metering tool for immersion or insertion of the metering tool into a substance present in the substance container and, as a result, provision of the metering tool with substance, and b3) raising of the metering tool out of the substance container.

With this embodiment of the method, the provision of the metering tool with substance to be metered is effected in a simple and practical way by immersion of the metering tool in the substance to be metered.

Alternatively, the provision of the metering tool with substance to be metered comprises the following steps:

b1) positioning of the metering tool below a dispensing tool and b2) application of substance to the metering tool by means of the dispensing tool.

In this variant of the method, the metering tool is wetted directly, so that immersion in the substance can be omitted.

According to a further advantageous embodiment, the metering tool is first wetted with a liquid adhesive substance and then provided with the substance to be metered. This is especially advantageous for metering pulverulent substances which barely adhere to surfaces. As liquid adhesive substance there is advantageously used a liquid which is either anyway already present in the target container or is added only later. Wetting with the liquid adhesive substance and provision with the substance to be metered, for example a pulverulent substance, can be effected, for example, by immersion of the metering tool in the relevant substances.

Advantageously a number of a plurality of identical or at least to some extent different metering tools are stored in a rack, and the metering tool to be picked up by the gripping tool is selected from those stored metering tools. In this way it is possible to use the metering tool most suitable for the particular metering task or substance/amount of substance to be metered. Furthermore, by suitable selection of the metering tools it is in this way possible to achieve different metered amounts ranging from a few hundred mg down to the sub-milligram range.

Advantageously the picking-up of the metering tool is effected by a gripping tool having openable and closable gripping jaws.

In a further advantageous implementation, the metering tool (by appropriate configuration of the gripping tool) can be picked up and held by means of reduced pressure (vacuum). This is especially advantageous, for example, when spherical metering tools or adhesive bodies are used.

According to a further advantageous implementation, the metering tool (by appropriate configuration of the gripping tool) can be picked up and held electromagnetically. This is advantageous, for example, when ferromagnetic metering tools are used.

According to a further advantageous embodiment, the metering operation is carried out in individual partial metering operations, wherein a stepwise approach to a required desired metered amount takes place, preferably while being monitored by a scales. Especially precise metering is possible in this way.

According to a further advantageous embodiment, the actual total amount of substance metered into the target container is measured by means of a (further) scales.

The apparatus according to the invention can also be used for what is known as complementary metering: if a relatively large amount of a substance needs to be metered very accurately, a conventional metering tool can be used to meter, for example, 99% of the substance and then the balance to make up as far as possible the exact value can be metered using the principle described herein.

BRIEF DESCRIPTION OF THE DRAWING

The invention is described in greater detail below with reference to exemplary embodiments shown in the drawings, wherein.

DESCRIPTION OF THE INVENTION

The following observations apply in respect of the description which follows: where, for the purpose of clarity of the drawings, reference signs are included in a Figure but are not mentioned in the directly associated part of the description, reference should be made to the explanation of those reference signs in the preceding or subsequent parts of the description. Conversely, to avoid overcomplication of the drawings, reference signs that are less relevant for immediate understanding are not included in all Figures. In that case, reference should be made to the other Figures.

The first embodiment of the metering apparatus shown in FIGS. 1-6 comprises a tool head 20, which is releasably mounted on a robot arm 10 indicated only symbolically by a box. A controller (electronic control system) 100 is provided for controlling the movement of the robot arm 10. By means of the robot arm 10, the tool head 20 can be moved in all three spatial directions within the range of the robot arm and rotated about a vertical (in the normal operating position of the apparatus) axis.

The tool head 20 is equipped with a gripping tool 30 which in the example herein is provided with gripping jaws 31 which are movable relative to one another in order to grip, hold and release a metering tool 40. The gripping tool 30, or the opening and closing movement of the gripping jaws 31, is likewise controlled by the controller 100. The gripping tool 30 can also be differently constructed. For example, it can be configured for holding the metering tool in place by means of reduced pressure (vacuum) or for holding the metering tool in place on an electromagnetic basis. In the latter case the metering tool would, of course, have to be correspondingly ferromagnetically configured.

The apparatus is further equipped with a scales 50 on which a substance container A containing a substance S to be metered has been placed. The scales 50 is advantageously an analytical balance having a resolution and accuracy of at least approximately 0.1 mg to 0.01 mg, preferably even approximately to 0.001 mg or even greater accuracy.

Furthermore, the apparatus comprises a further scales 90, on which there has been placed a target container Z into which a metered amount of the substance S to be metered is to be introduced. The target container Z is often a container to which a plurality of substances are added during the preparation of a product P (for example a colour mixture). The scales 90 is advantageously likewise an analytical balance having a resolution and accuracy of at least approximately 0.1 mg to 0.01 mg, preferably even approximately to 0.001 mg or even greater accuracy.

The two sets of scales 50 and 90 co-operate with the controller 100 to the effect that the controller initiates the weighings to be carried out with the scales and reads out and utilises the measurement results.

FIGS. 1-6 also show a waste container W for receiving discarded metering tools 40 and a rack 39 in which a number of metering tools 40 are stored. This will be described in greater detail below.

The actual substance metering operation, that is to say the picking-up of substance to be metered from the substance container A and the release of a metered amount of substance into the target container Z, is effected by means of the metering tool 40 which, in accordance with a main concept of the invention, is configured as an adhesive body to the surface of which a small amount of substance is able to adhere. An adhesive body is to be understood in the present context as being a body of any shape, to which substance adheres only on the surface of the body.

In the exemplary embodiment of FIGS. 1-6, the metering tool or the adhesive body 40 is to configured as a thin cylindrical glass rod. Further configurations of the adhesive body are explained hereinbelow especially in conjunction with FIGS. 10-17.

The metering tool or the adhesive body 40 can in principle also be formed from a material other than glass, for example from plastics material or metal. Glass is chemically inert in virtually all cases, however, and therefore advantageous.

The mode of operation of the exemplary embodiment of the metering apparatus according to the invention shown in FIGS. 1-6 is described hereinbelow.

Figure 1:
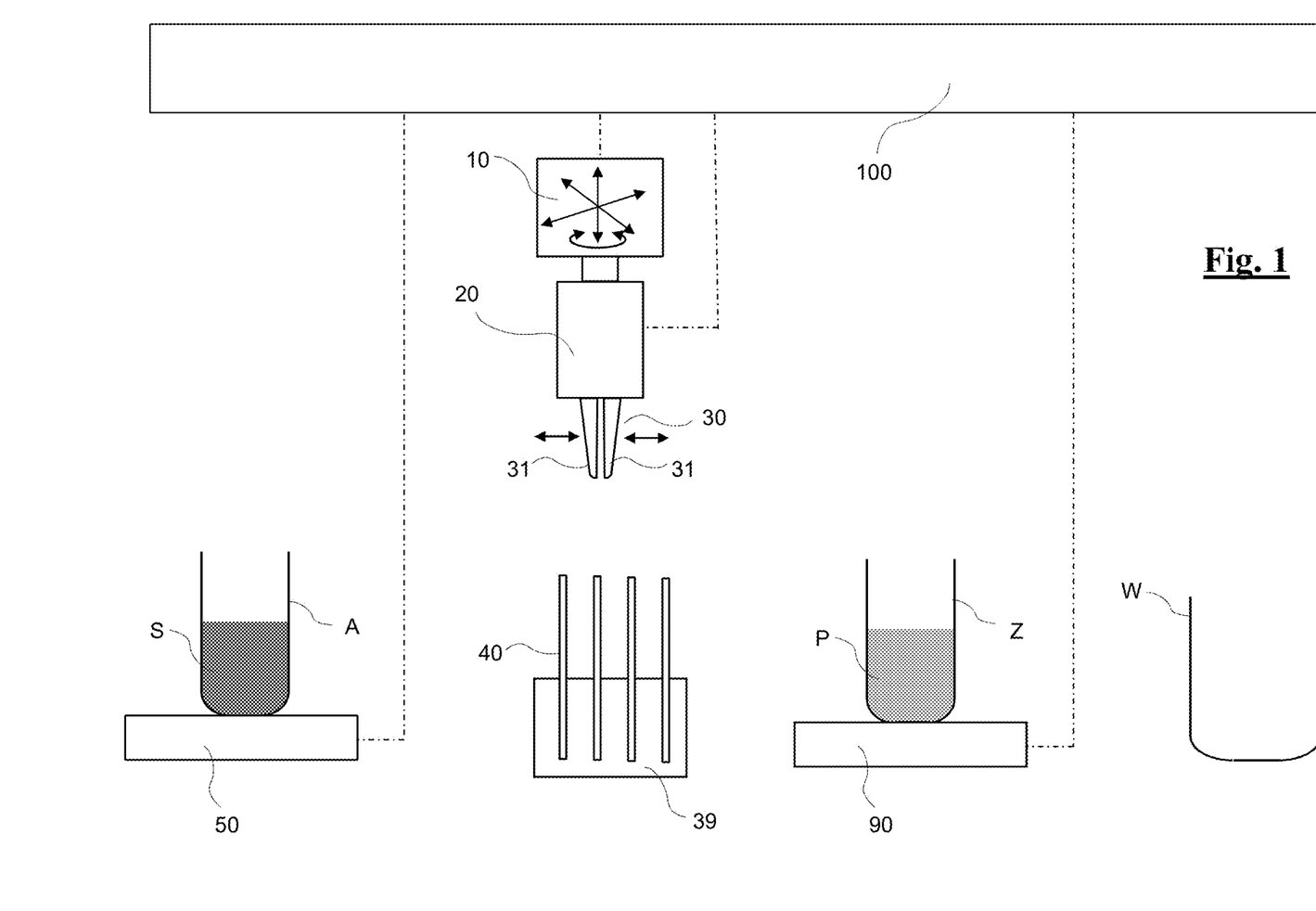
FIG. 1-6—each show a diagrammatic representation of a first exemplary embodiment of the metering apparatus according to the invention in six characteristic phases of a metering operation.
Figure 2:
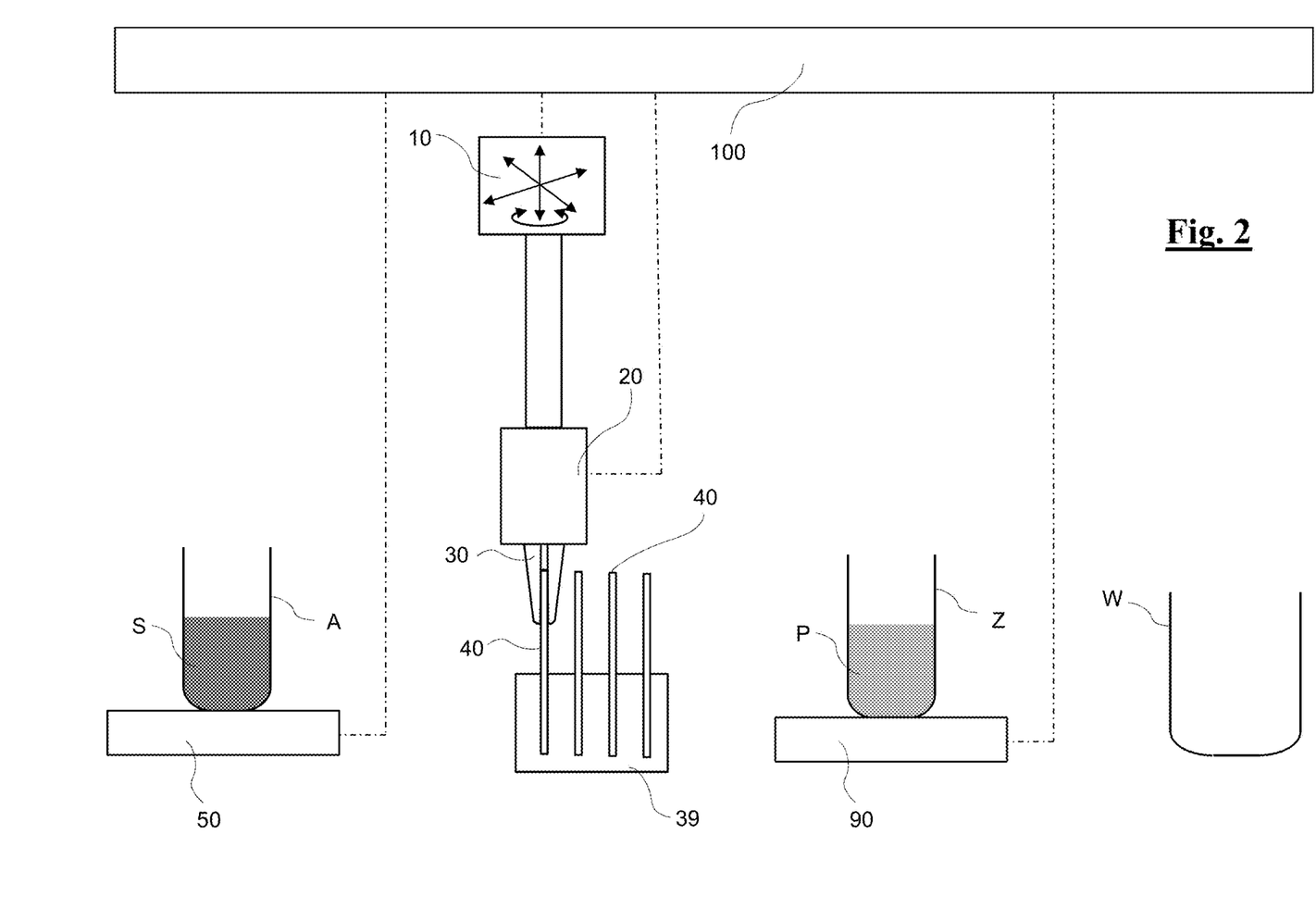

In the starting state of the metering apparatus shown in FIG. 1 there is as yet no metering tool 40 in the gripping tool 30. A number of metering tools 40 are kept in stock in rack 39. By means of the robot arm 10, the tool head 20 with the gripping tool 30 is moved towards the rack 39 and the gripping tool 30 grasps a metering tool 40 and holds it in place (FIG. 2). It will be understood that conversely it would also be possible for the rack 39 to be moved towards the tool head 20 and then moved away again by means of some other transport device.

By movement of the robot arm 10, the metering tool 40 is then removed from the rack 39 and moved to a substance container A held in readiness on the scales 50. Before the metering tool 40 is immersed in the substance container A, the total weight $M_0$ of the substance container A, including the substance S currently contained therein, is measured by means of the scales 50.

The metering tool 40 is then lowered by means of the robot arm 10 until the metering tool 40 is immersed in or, depending upon the consistency of the substance, inserted into the substance S (FIG. 3), during which the immersed surface of the glass rod or the metering tool 40 is wetted with substance S.

Figure 4:
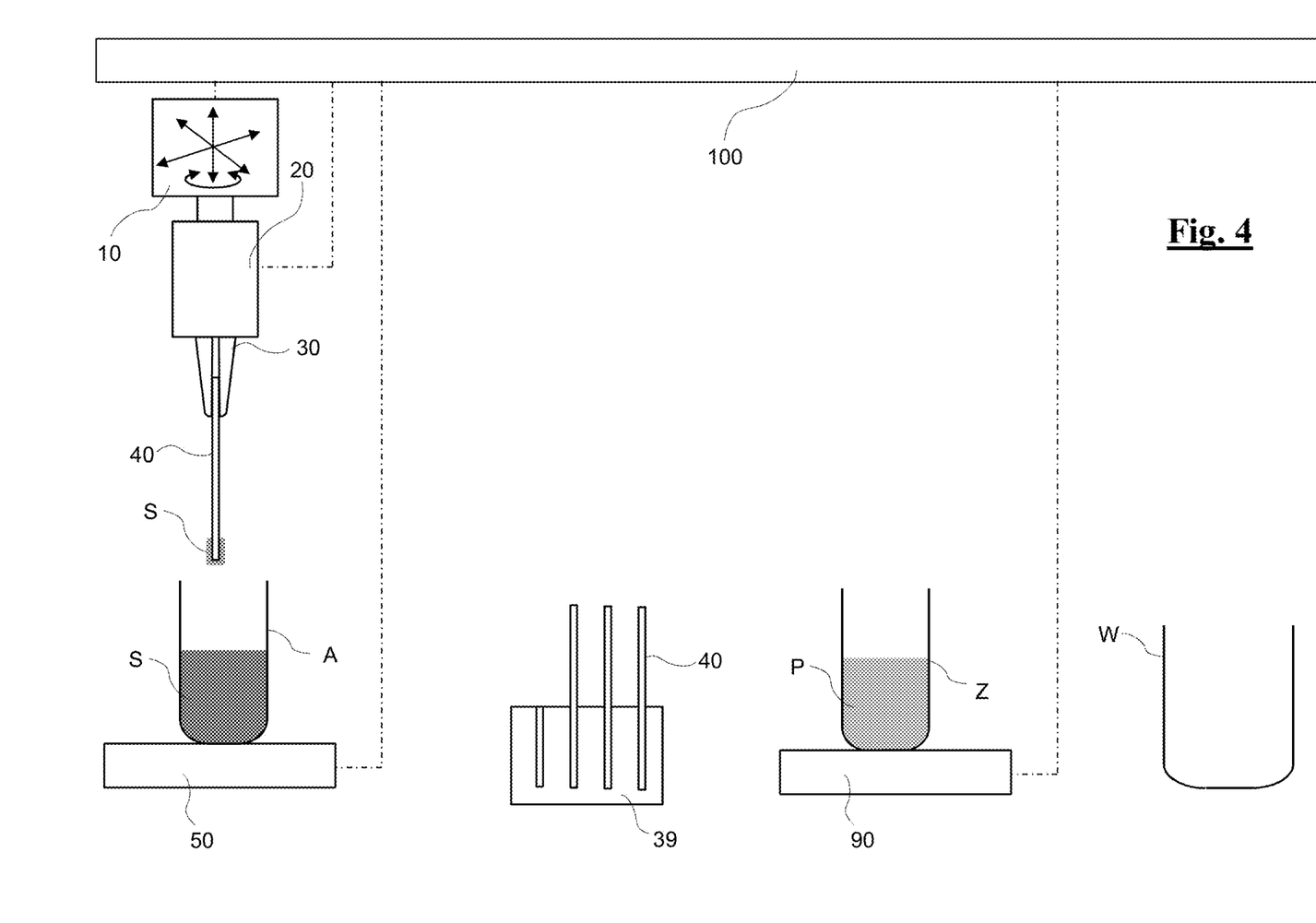

The metering tool 40 is then raised above the rim of the substance container A by means of the robot arm 10. In the event of droplet formation, during a short waiting period excess substance, i.e. non-adhering substance, is allowed to drop back into the substance container A. Using the scales 50, a fresh weight measurement is then carried out and accordingly the amount (weight) $M_S$ of the substance S picked up by the metering tool 40 is measured by subtraction of the weight $M_1$ then measured from the weight $M_0$ measured before the substance was picked up (FIG. 4).

Figure 5:
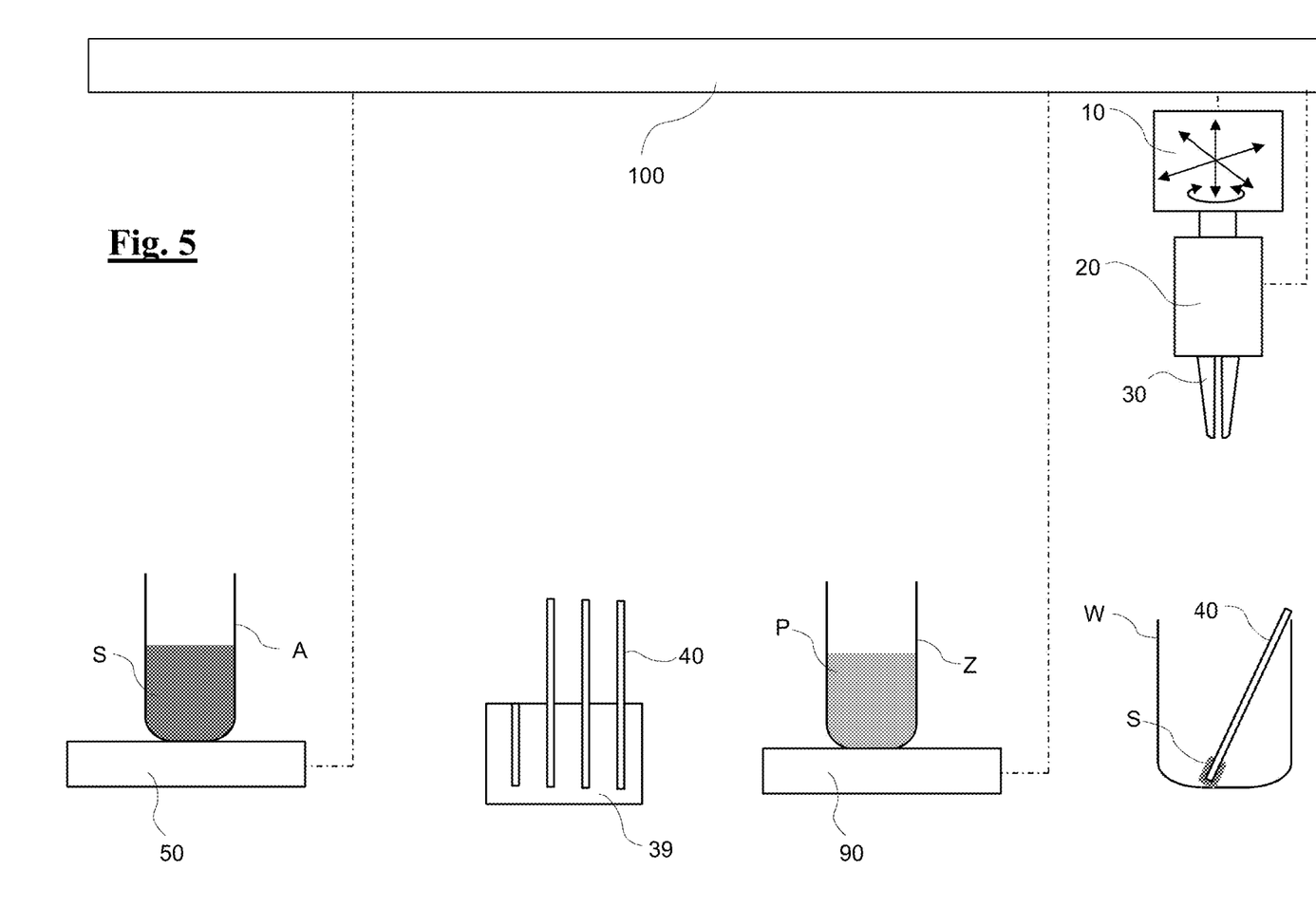

A desired amount (target metered amount) $M_Z$ specified for the metering operation in question is stored in the controller 100. If the amount of substance $M_S$ picked up, that is to say adhering to the metering tool 40, is greater than the specified desired or target metered amount $M_Z$, the metering tool 40 is moved by means of the robot arm 10 to the waste container W where it is discarded by opening of the gripping tool 30 (FIG. 5). Then, analogously to FIG. 2, a fresh metering tool 40 is taken from the rack 39 and the immersion operation is repeated analogously to FIG. 3 but this time with a shallower immersion depth. The controller 100, with reference to the measurement results obtained during the first picking-up operation, can adjust that immersion depth appropriately in order that, on the second attempt, exactly the desired metered amount is then picked up. If the amount of substance picked up is still greater than the target metered amount, the operation is repeated, each time using a fresh metering tool, until the amount of substance picked up corresponds with sufficient accuracy to the required desired or target metering amount.

Figure 3:
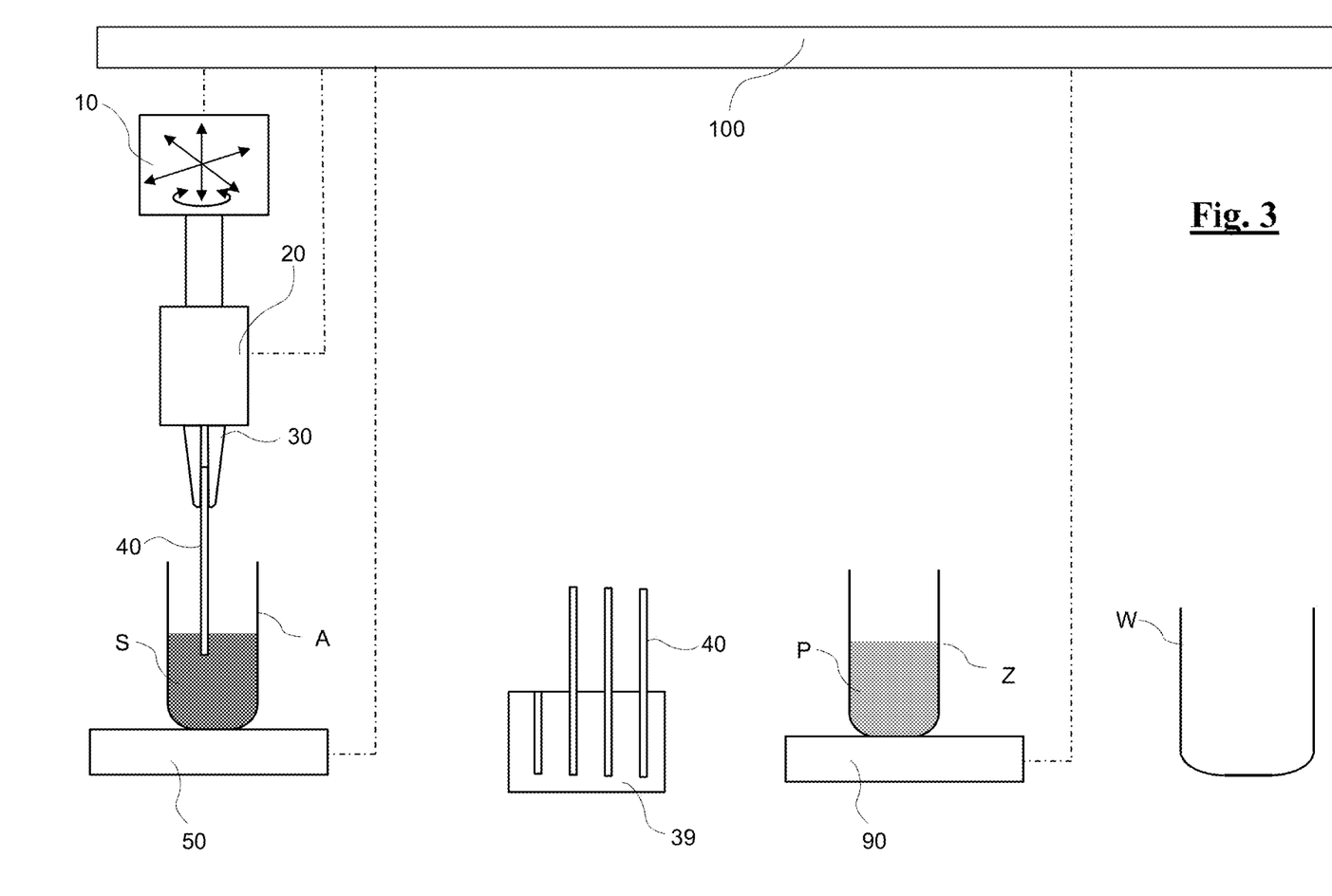

Conversely, if the amount of substance picked up is too small, the same metering tool 40 is once more immersed in the substance container A analogously to FIG. 3, but this time to a greater immersion depth calculated by the controller. Such adjustment of the amount of substance picked up can also take place iteratively in a plurality of steps (Feedback Loop).

Figure 6:
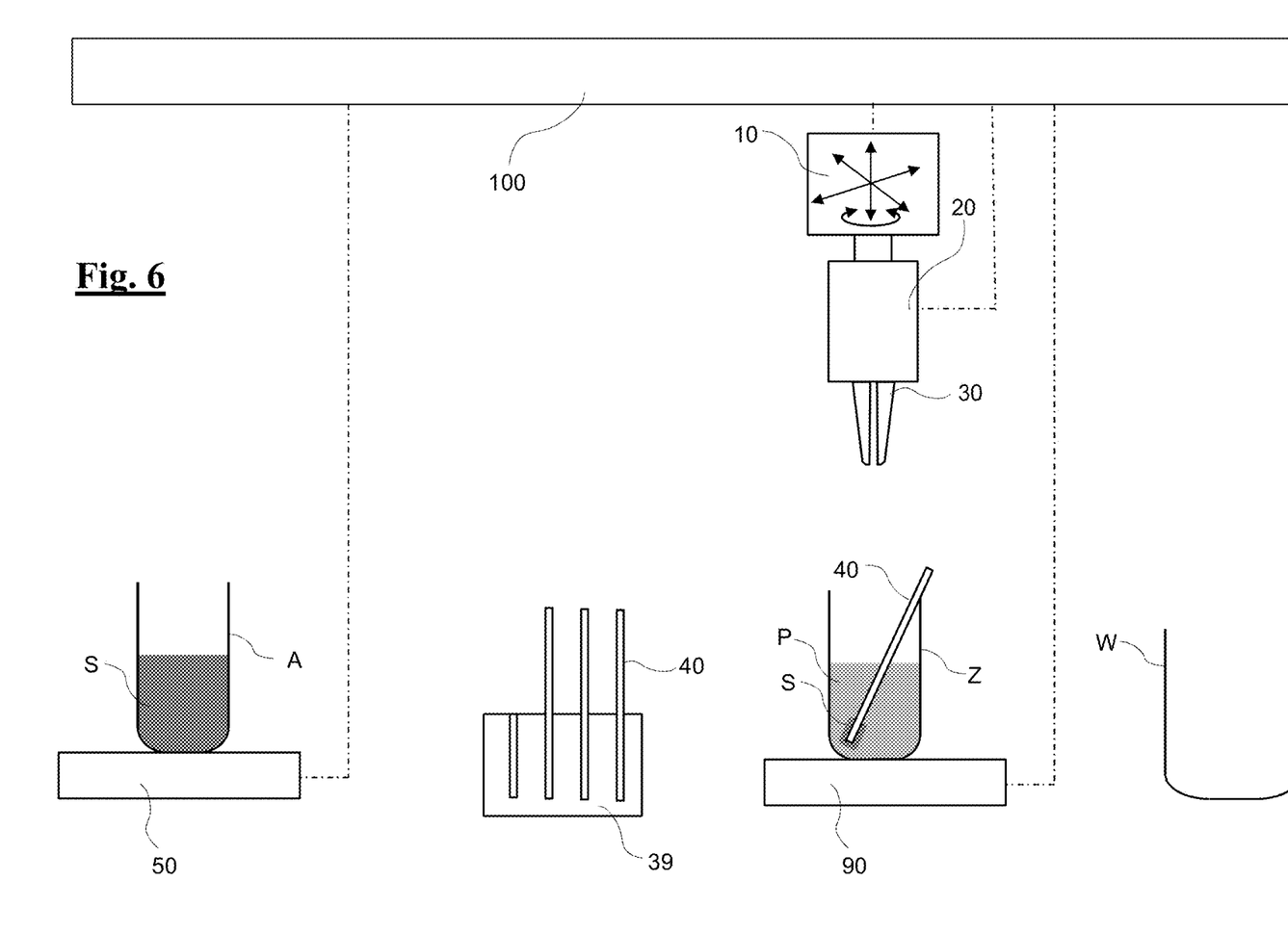

Once the desired target amount $M_Z$ has been picked up, that is to say the amount of substance picked up corresponds to the desired target metered amount, the gripping tool 30 together with the metering tool 40 held therein is moved by means of the robot arm 10 over the target container Z to which the substance S is to be added, the target container being held in readiness on the scales 90. Then, by opening the gripper 30, the metering tool 40 together with the adherent amount of substance S is allowed to fall into the target container Z (FIG. 6).

If a further substance is to be added to the product P contained in the target container Z, a fresh metering tool 40 is again taken up from the rack 39 and the metering of the further substance takes place again in accordance with the method sequence (immersion, adjustment, dropping) described above with reference to FIG. 1-6.

By means of the scales 90, the amount of substance actually added to the target container Z can be monitored (provided the weight of the metering tools 40 in question is known).

At the end of each metering operation, the previously used metering tool is discarded, that is to say it is not re-used. As a result, contamination problems are avoided with the greatest possible reliability. The metering apparatus according to the invention makes this concept possible by the use of the specially configured metering tools which are the only parts of the entire metering apparatus to come into contact with the substances to be metered. The metering tools 40 consist of only a single, structurally extremely simple component (for example a glass rod) which is simple and economical to produce as a mass-produced article, so that its use as a disposable component is economically viable.

Figure 7:
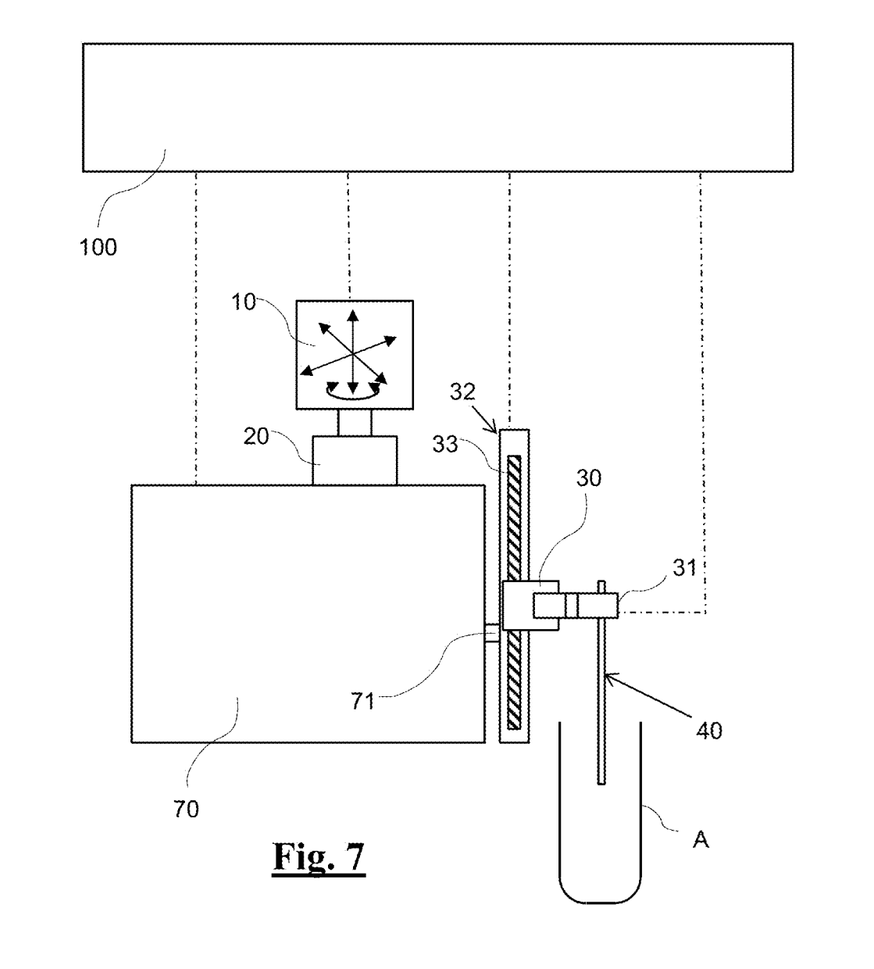
FIG. 7—shows a diagrammatic representation of a second exemplary embodiment of the metering apparatus according to the invention.

FIG. 7 shows a second embodiment of the metering apparatus according to the invention, wherein only the components necessary for understanding are shown. All other components are the same as in the exemplary embodiment according to FIGS. 1-6.

The tool head 20 here carries a scales 70, to the beam 71 of which there is attached a raising and lowering device 32 controlled by the controller 100. The gripping tool 30 with its gripping jaws 31 is mounted on the raising and lowering device 32 and can be moved vertically, that is to say raised and lowered, by the latter via a motor-driven spindle 33. The scales 70 measures the total weight of the raising and lowering device 32, the gripping tool 30 and the metering tool 40 held therein with and without the adherent amount of substance.

The mode of operation of this exemplary embodiment of the metering apparatus is largely the same as in the exemplary embodiment of FIGS. 1-6. The sole difference lies in the fact that the lowering and raising of the metering tool 40, for example for picking up substance from the substance container A, is effected by means of the raising and lowering device 32 (and not by the robot arm 10). The determination of the amount of substance picked up by the metering tool 40 is effected by weighing the parts situated on the scales before and after the substance is picked up. Since the weight of the raising and lowering device 32 and the gripping tool 30 are system constants, this corresponds to weighing the metering tool 40 before and after the substance is picked up.

This embodiment of the metering apparatus is especially advantageous when a very large number of different substance containers A need to be used (the placement of which on a scales 50 underneath would be very time-consuming) or when the amount of substance to be metered is relatively large (two or more digit milligram range), so that the required measuring accuracy of the scales 70 can be kept relatively low (maximum accuracy 0.1-1 mg), thus allowing the use of more economical scales. The raising and lowering device 32 enables the metering tool 40 held in the gripping tool 30 to be moved vertically without it being necessary to move the tool head 20 itself together with the attached scales 70, which is often shock-sensitive.

Figures 8, 9:
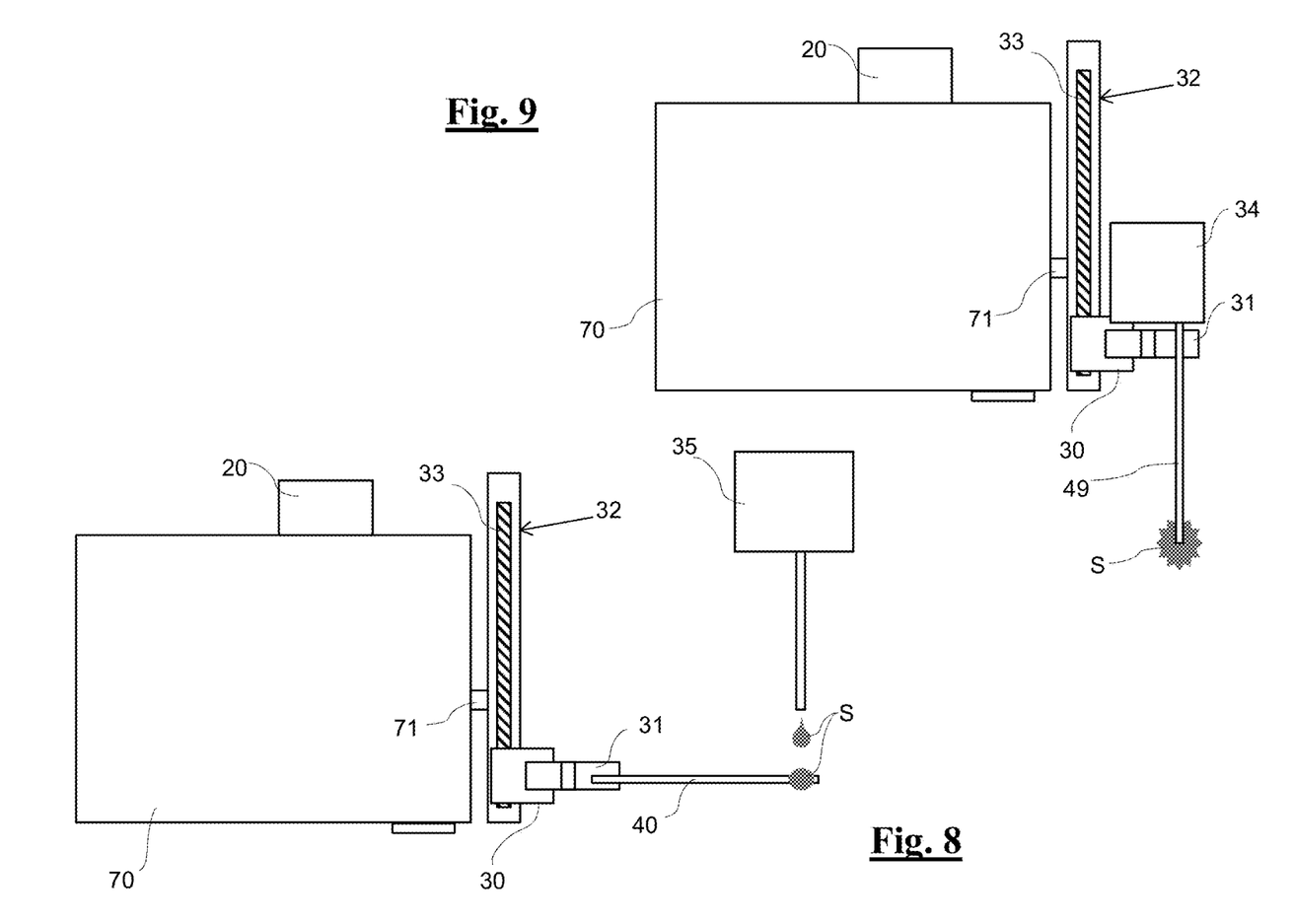
FIG. 8-9—each show a diagrammatic representation of two variants of the metering apparatus according to FIG. 7.

Instead of the metering tool 40 being immersed in a substance container for the purpose of picking up substance, according to a further configuration of the metering apparatus, which is shown in a simplified view in FIG. 8, direct wetting of the metering tool 40 is also possible. For that purpose the metering apparatus, which is configured analogously to the exemplary embodiment of FIG. 7, is additionally equipped with a dispensing tool 35 which is suitable for dispensing the substance to be metered. For example, the dispensing tool 35 can be a powder-metering device or a liquid-metering device. For the purpose of picking up substance, the metering tool 40 is moved under the dispensing tool 35 by means of the robot arm and the raising and lowering device 32, as shown in FIG. 8. By means of the dispensing tool 35, the metering tool 40 is then provided directly with the substance S, a certain amount of substance again remaining adhering to the metering tool 40. After the dispensing step, the amount of substance S adhering to the metering tool 40 can be accurately measured by means of the scales 70 mounted on the tool head 20, and, of course, if the amount to be metered is too small, further substance can be added or, if the amount to be metered is too large, the metering tool 40 can be discarded and the entire operation repeated, as described above in connection with FIGS. 1-6.

FIGS. 10-17 show various configurations of metering tools, the different shapes, structures and surface characteristics of which allow their use with a multiplicity of substances having different physical properties. Substance S to be metered adhering to the metering tools forms a kind of film on the metering tool, the film being shown as a dark-grey area in the Figures.

Figure 10:
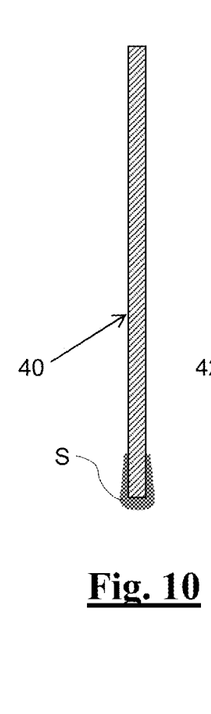
FIG. 10-17—show different variants of metering tools used in the metering apparatus.

FIG. 10 shows the simplest form of a metering tool as a cylindrical rod 40. Depending upon the nature of the substance (liquid) S to be metered, the film can collect in the form of a droplet at the lower end of the cylinder not intended for being held in the gripping tool 30.

Figures 11, 12:
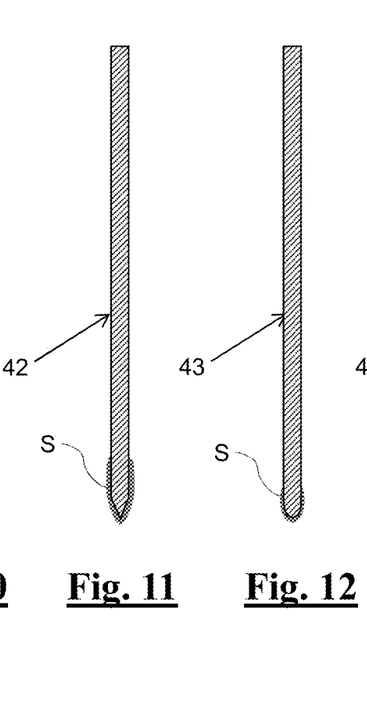

In order to counteract droplet formation, at its lower end not intended for being held in the gripping tool the cylindrical rod according to FIGS. 11 and 12 can be tapered, especially conically, to a point or can be rounded. The metering tools so configured are denoted by reference numerals 42 and 43, respectively. The avoidance of droplet formation enables an even smaller amount of liquid to be picked up and, in addition, reduces the risk that a droplet collecting at the tip will fall off prematurely.

Figure 13:
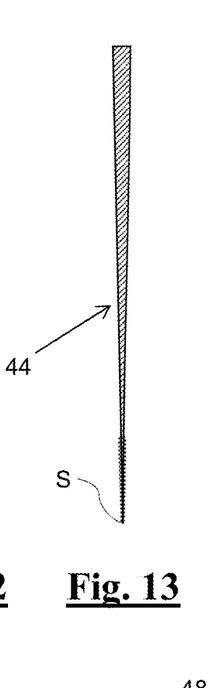

FIG. 13 shows a metering tool 44 configured as a whole in the form of a point, especially a conical point, which allows extremely small amounts of liquid to be picked up.

Figure 14:
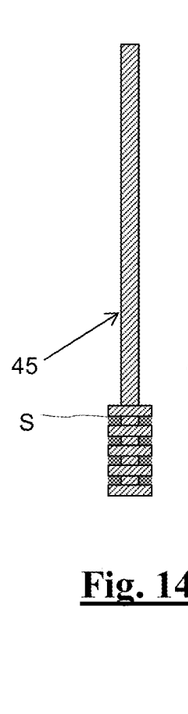

The metering tool 45 shown in FIG. 14 is especially suitable for very surface-active liquid substances which barely adhere to smooth surfaces. At its lower end not intended for being held in the gripping tool, the metering tool is provided with grooves or gradations, the adhesion of the substance being improved as a result of the capillary forces arising in the grooves or gradations.

Figure 15:
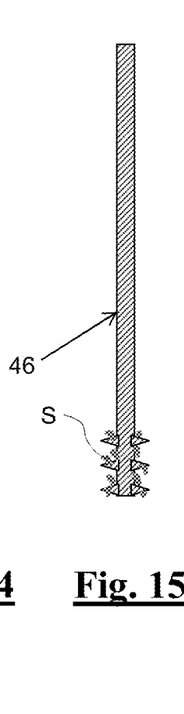
Figure 16:
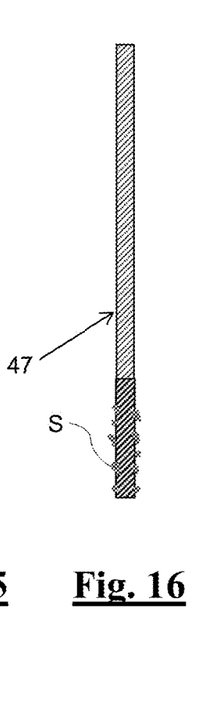

FIG. 15 shows a metering tool 46 which, at its lower end not intended for being held in the gripping tool, is provided with surface structures in the form of spikes and projections which can enable, for example, even particulate solids, but also liquids, to adhere. Alternatively, the metering tool 47 shown in FIG. 16, at its lower end not intended for being held in the gripping tool, is simply provided with a rough surface (dark hatched region) to which liquids and particles better adhere.

With regard to picking up extremely small amounts of substance, the substantially cylindrical metering tools 40-43 and 45-47 advantageously have a diameter in the range of from 0.1 to 3 mm, preferably from 0.1 to 2 mm, more preferably from 0.1 to 1 mm. In the case of the conical metering tool 44, those dimensions relate to the upper end of the metering tool intended for being held in the gripping tool.

Figure 17:
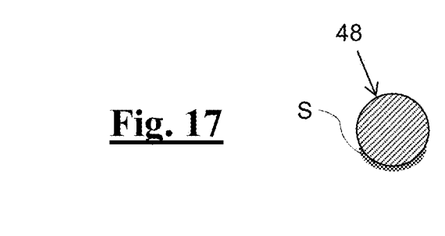

FIG. 17 finally shows a spherical metering tool 48. This form of metering tool is especially advantageous in those applications in which mixing and/or grinding operations are required in the target container. The spherical metering tools loaded with the metered amount of substance and introduced into the target container can then be additionally utilised also for such mixing and/or grinding operations.

The embodiments of the metering tools shown in FIGS. 10-17 are to be understood as being purely exemplary. It will be understood that any desired other configurations are also possible within the scope of the present invention.

The metering body/bodies can also be differently configured in respect of the material of which they consist. Glass is especially suitable on cost grounds and because it is virtually inert in all cases.

The metering tool can, however, also be, for example, metallic. This allows electrostatic charging of the metering tool held in the gripping tool, so that it is able to pick up electrostatically adhering substances.

FIG. 9 shows a variant of the metering apparatus according to the invention which corresponds substantially to the variant according to FIG. 7 but additionally has an electrostatic charging device 34 which, on activation, electrostatically charges a (metallic) metering tool 49 that is configured to be electrostatically chargeable, this in turn also allowing correspondingly suitable substances S in the form of powders and granules to be picked up and transferred.

In a further variant (not shown) of the metering apparatus according to the invention, which is substantially identical in structure to the embodiment of FIG. 9, the electrostatic charging device 34 is replaced by an electromagnetic magnetisation device by means of which a metering tool made of ferromagnetic metal held in the gripping tool 30 can be magnetically charged, so that a magnetic field builds up and accordingly picks up ferromagnetic substances.

Figure 18:
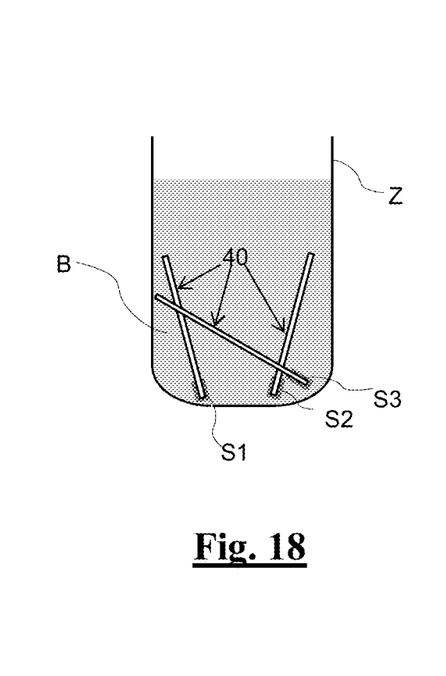
FIG. 18—shows a target container having a plurality of metering tools located therein, and FIG. 19-20—are two diagrams for illustrating how metering tools located in a target container are separated from a product present in the target container.

In practical applications it is often necessary to add a plurality of different substances to the target container in a plurality of metering operations described above in order to produce an end product P. FIG. 18 shows a target container Z in which a relatively large amount of a base liquid B (added by some other method) and three metering tools 40 loaded with different substances S1, S2 and S3 are present. In a next step, not shown in the drawing, the entire container Z, including the metering tools 40 dropped therein, would be stirred so that the substances S1, S2 and S3 introduced with the metering tools would intermix homogenously with one another and with the base substance B. The metering tools can be left in the target container Z because they are chemically inert and do not adversely affect the operation during mixing. In a further step, likewise not shown herein, the product formed by the intermixing can then be filtered in order to remove the metering tools located therein, or simply further use is made of only a very small amount of the product which is withdrawn from the target container Z as a sub-sample.

The metering tool(s) can, for example, also be ferromagnetically configured or consist of a ferromagnetic material. This is especially advantageous with regard to the handling of the metering tools located in the target container Z.

Ferromagnetically configured metering tools can be used, for example, as stirring devices in the target container, in which case the stirring movement would be brought about by an external magnetic field, as is customary in the case of magnetic stirrers.

Figure 19:
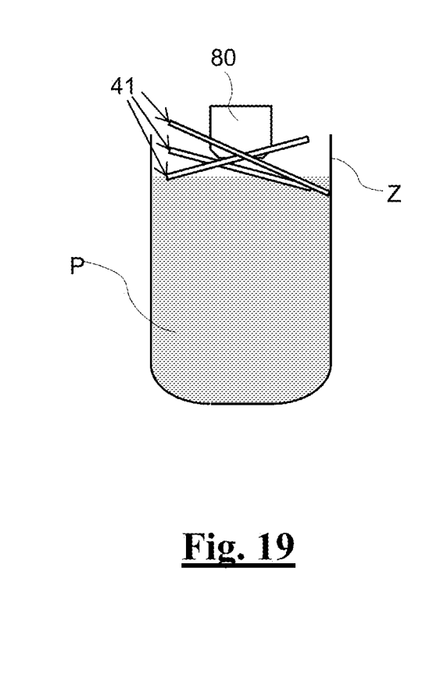

FIG. 19 shows in diagrammatic form how ferromagnetic ally configured metering tools 41, for example consisting of iron or steel, can be removed from the finished mixed product in the target container Z by means of a (movable) magnet 80.

Figure 20:
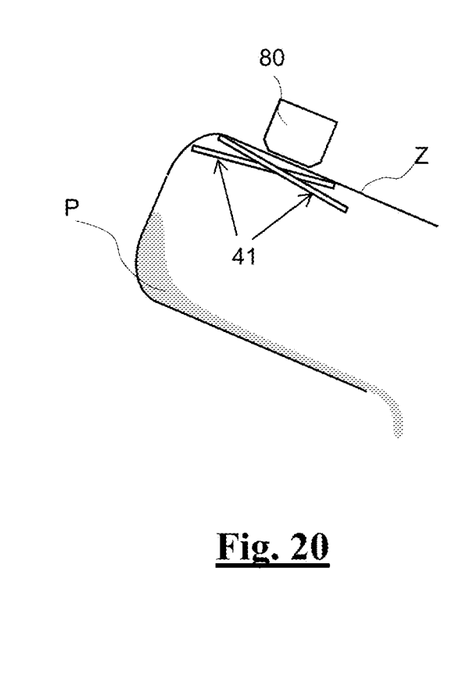

In the variant shown in FIG. 20, the ferromagnetic metering tools 41 are not removed from the target container Z but are temporarily held in place in the target container Z by means of the magnet 80, while the finished product P is transferred to a further vessel (not shown) by emptying the receptacle. This variant is especially advantageous when it is desired to prevent the magnet 80 from being contaminated by contaminated metering tools 41 adhering thereto.

The invention claimed is:

1. An apparatus for metering a substance into a target container, having a metering tool for picking up and releasing substance, wherein:
    the metering tool is configured as an adhesive body, to the surface of which the substance to be metered is able to adhere,
    the apparatus has a gripping tool with which the metering tool can be picked up, held and released again,
    the apparatus is configured to provide the metering tool with substance to be metered, so that the latter adheres to the metering tool, and, by means of the gripping tool, to release the metering tool with the adherent substance into the target container or immerse it in the target container until the adherent substance has detached from the metering tool;
    the apparatus has a scales for determining the amount of substance adhering to the metering tool; and
    the apparatus has a controller for the scales and for the gripping tool.

2. The apparatus according to claim 1, wherein the adhesive body is configured as a rod.

3. The apparatus according to claim 1, wherein the adhesive body, at its end not intended for being held by the gripping tool, is configured to counteract droplet formation.

4. The apparatus according to claim 1, wherein the adhesive body is configured as a rod that tapers to a point.

5. The apparatus according to claim 1, wherein the adhesive body, at its end not intended for being held by the gripping tool, has an adhesion-enhancing surface structure.

6. The apparatus according to claim 1, wherein the adhesive body is spheroidal.

7. The apparatus according to claim 1, wherein the adhesive body has a maximum diameter in the range of from 0.1 to 3 mm.

8. The apparatus according to claim 1, wherein the adhesive body consists of a chemically inert material.

9. The apparatus according to claim 8, wherein the adhesive body consists of glass.

10. The apparatus according to claim 1, wherein the adhesive body is ferromagnetically configured or configured to be electrostatically or electromagnetically chargeable.

11. The apparatus according to claim 1, wherein the scales is configured and arranged for measuring the weight of a substance container from which the substance to be metered is withdrawable.

12. The apparatus according to claim 1, wherein the scales is configured and arranged for measuring the weight of the metering tool held by the gripping tool.

13. The apparatus according to claim 1, wherein the apparatus is equipped with a raising and lowering device by means of which the gripping tool can be raised and lowered, which device co-operates with the controller.

14. The apparatus according to claim 1, wherein the apparatus has a robot arm which co-operates with the controller and to which the gripping tool is attached, the gripping tool being movable by means of the robot arm in all three spatial directions and also about a vertical rotational axis.

15. The apparatus according to claim 1, wherein the apparatus has a rack for a number of a plurality of identical or a plurality of at least to some extent different metering tools or at least one dispenser for metering tools.

16. The apparatus according to claim 1, wherein the apparatus has a dispensing tool for provision of the metering tool with substance to be metered.

17. A method for metering a substance into a target container, comprising:
    a) picking-up of a metering tool configured as an adhesive body by means of a gripping tool;
    b) provision of the metering tool with substance to be metered;
    c) determination of the amount of substance adhering to the metering tool;
    d) if the adherent amount of substance is greater than a desired amount, discarding of the metering tool and repetition of steps a)-d) with a fresh metering tool until the adherent amount of substance is less than the desired amount or corresponds to the desired amount;
    e) if the adherent amount of substance is less than the desired amount, further provision of the metering tool with substance to be metered and repetition of steps c)-e) until the adherent amount of substance corresponds to the desired amount; and
    f) if the adherent amount of substance corresponds to the desired amount, positioning of the metering tool above the target container and dropping of the metering tool with the adherent amount of substance into the target container or immersion of the metering tool with the adherent amount of substance in the target container until the adherent substance has detached from the metering tool.

18. The method according to claim 17, wherein the provision of the metering tool with substance to be metered comprises:
- b1) positioning of the metering tool above a substance container;
- b2) lowering of the metering tool for immersion or insertion of the metering tool into a substance present in the substance container and, as a result, provision of the metering tool with substance, and
- b3) raising of the metering tool out of the substance container.

19. The method according to claim 17, wherein the provision of the metering tool with substance to be metered comprises:
- b1) positioning of the metering tool below a dispensing tool and
- b2) application of substance to the metering tool by means of the dispensing tool.

20. The method according to claim 17, wherein the metering tool is first wetted with a liquid adhesive substance and then provided with the substance to be metered.

21. The method according to claim 17, wherein a number of a plurality of identical or at least to some extent different metering tools are stored in a rack, and the metering tool to be picked up by the gripping tool is selected from those stored metering tools.

22. The method according to claim 17, wherein the picking-up of the metering tool is effected by a gripping tool having openable and closable gripping jaws.

23. The method according to claim 17, wherein the metering tool is picked up and held by the gripping tool by means of reduced pressure.

24. The method according to claim 17, wherein the metering tool is picked up and held by the gripping tool electromagnetically.

25. The method according to claim 17, wherein the metering operation is carried out in individual partial metering operations, wherein a stepwise approach to a required desired metered amount takes place.

26. The method according to claim 17, wherein the actual total amount of substance metered into the target container is measured by means of a scales.

27. The method according to claim 17, wherein the method is carried out using an apparatus for metering a substance into a target container, having a metering tool for picking up and releasing substance, wherein:
- the metering tool is configured as an adhesive body, to the surface of which the substance to be metered is able to adhere,
- the apparatus has a gripping tool with which the metering tool can be picked up, held and released again,
- the apparatus is configured to provide the metering tool with substance to be metered, so that the latter adheres to the metering tool, and, by means of the gripping tool, to release the metering tool with the adherent substance into the target container or immerse it in the target container until the adherent substance has detached from the metering tool;
- the apparatus has a scales for determining the amount of substance adhering to the metering tool; and
- the apparatus has a controller for the scales and for the gripping tool.

* * * * *